W. K. HOWE.
DETENT MECHANISM.
APPLICATION FILED MAY 28, 1910.

985,677.

Patented Feb. 28, 1911.

Witnesses:
Clarence W. Carroll
L. Thon

Inventor:
Winthrop K. Howe
by his attorneys
Osgood, Davis & Dorsey

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

DETENT MECHANISM.

985,677. Specification of Letters Patent. Patented Feb. 28, 1911.

Original application filed December 3, 1909, Serial No. 531,264. Divided and this application filed May 28, 1910. Serial No. 564,019.

*To all whom it may concern:*

Be it known that I, WINTHROP K. HOWE, a citizen of the United States, and resident of Rochester, in the county of Monroe and State of New York, have invented certain new and useful Improvements in Detent Mechanism, of which the following is a specification.

This application relates to a detent mechanism adapted particularly for use in connection with electric railway signals, but applicable to various other purposes.

One object of the invention is to produce a detent mechanism which shall be positive in operation, but which may be engaged and released with certainty by the application of a very small amount of power, and to this end I employ in my mechanism a detent comprising a novel antifriction device, which will be hereinafter described.

Other objects and features of the invention will be set forth in connection with the following description of the illustrated embodiment of the invention.

Figure 1:
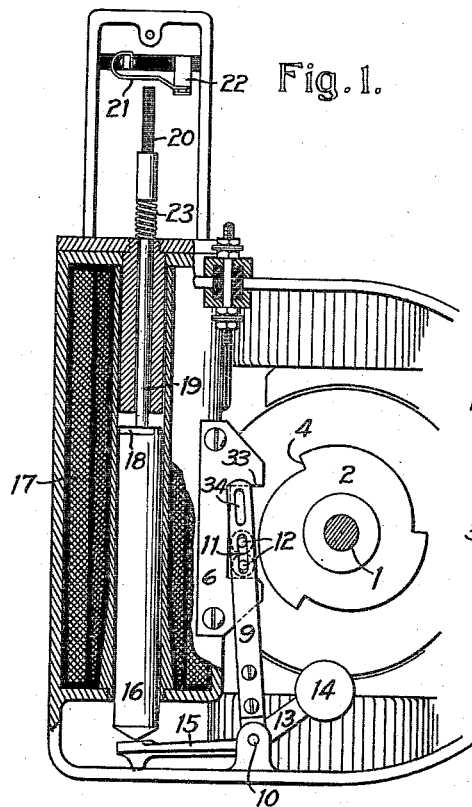
Figure 2:
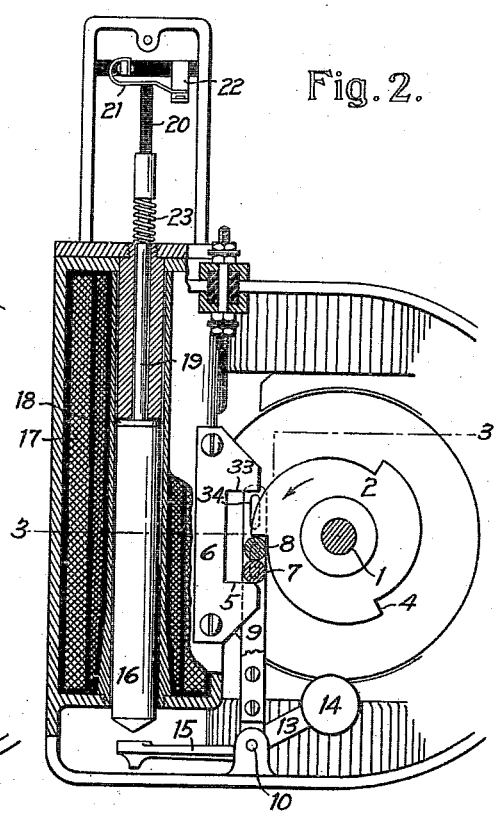
Figure 3:
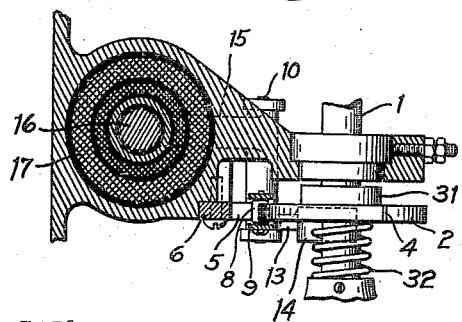

In the accompanying drawings: Figure 1 is a front elevation, partly in section, of a detent mechanism embodying the present invention, showing the detent in inoperative position; Fig. 2 is a similar view showing the detent in operation; and Fig. 3 is a section on the line 3—3 in Fig. 2, looking downward.

In the drawings the invention is illustrated as embodied in a detent mechanism adapted for use, in connection with an electric semaphore mechanism of well-known type, for the purpose of holding the semaphore in clear position during the maintenance of the semaphore-controlling circuit.

The detent mechanism of the drawings comprises two members having coöperating abutments, between which a third member, constituting a movable detent, may be interposed to arrest relative movement of the abutment members. One of said members is mounted upon a shaft 1, which is connected with the semaphore-actuating mechanism or other mechanism of which the movement is to be arrested, and is in the form of a ratchet 2 provided with three substantially radial teeth or abutments 4. The other abutment is in the form of a horizontal surface or ledge 5 formed in a plate 6 which is rigidly secured to a fixed part of the mechanism. The detent comprises two rollers 7 and 8 which are carried by a double arm 9 extending upwardly from a pivotal support 10 on the casing of the apparatus. The two parallel members of the arm 9 are provided with slots 11 which are engaged by gudgeons 12 at the ends of the rollers 7 and 8. As shown in Fig. 1, the slots are of sufficient length to enable the roller 7 to rest upon the ledge 5, while the roller 8 rests upon the roller 7. The two rollers thus constitute an antifriction device, for when they are engaged, respectively, by the two abutments before referred to, as in Fig. 2, pivotal movements of the arm 9 cause the two rollers to roll against the surfaces of the abutments and also against each other, so that, except for the negligible friction of the gudgeons against the sides of the slots 11, there is no friction in the device except the rolling friction between the rollers and the abutment surfaces, and thus the rollers may be moved upon the ledge 5 so as to engage and disengage the abutments 4 with the expenditure of a very slight amount of power.

The arm 9 is moved in one direction by means of an arm 13 rigidly connected with the former and provided with a weight 14. This weight tends to swing the arms and the detent into the operative position of Fig. 2. In the normal condition of the apparatus, however, this operation is prevented, and the detent is held in the position of Fig. 1, through the action of an armature core 16 of substantial weight, which rests upon a third arm 15 rigidly connected with the arms 9 and 13, the weight of the core 16 being sufficient to overcome that of the weight 14. The core 16 is controlled by a solenoid 17, and when the solenoid is energized the core is raised and held raised, thereby allowing the detent to operate as in Fig. 2. The upward movement of the core is arrested by a stop-disk 18 arranged above the core on the lower end of a vertically-sliding plunger 19. The plunger carries, at its upper end, a plug 20 of insulating material, which is adapted to engage and raise a resilient contact-finger 21 which coöperates with an insulated fixed contact 22. The functions of these parts are not described as they constitute no part of the invention claimed herein.

Below the head of the plunger 19 a compression spring 23 is coiled around the plunger, and its lower end rests upon a fixed part of the apparatus. This spring resiliently supports the stop, and, during the first movement of the core and the plunger, it assists in raising the stop. It also acts to cushion the return movement of the stop when the plunger falls.

The detent member 6 is provided with a second ledge or abutment 33, and the arm 9 is also provided with a second pair of slots 34. By reversing the position of the detent member 2 on the shaft 1, and removing the rollers from the slots 11 to the slots 34, the device may be used to arrest rotation of the shaft 1 in the opposite direction from that indicated by the arrow in Fig. 2. This arrangement is particularly useful in connection with semaphores, since two types of semaphores are commonly employed, in one of which the movement of the arm in going to danger position is opposite in direction to the corresponding movement of the other type, and thus the detent mechanism is adapted, without substantial change, to operate in connection with either type of semaphore.

In Fig. 3 the detent member 2 is shown as connected with the shaft 1 by means of a friction device including a spring 32. This arrangement consitutes an element of an invention disclosed and claimed in my copending application Serial No. 531,264, filed December 3, 1909, of which the present application is a division, and it is not, therefore, claimed or particularly described herein.

My invention is not limited to the embodiment thereof illustrated in the accompanying drawings and hereinbefore described, but may be embodied in various other forms within the nature of the invention as it is defined in the following claims.

I claim:—

1. Detent mechanism having, in combination, two relatively-movable members provided with oppositely-disposed abutments, a detent adapted to be interposed between said abutments to arrest relative movement thereof and comprising two antifriction rollers free to roll upon each other and against said abutments, respectively, and means for moving the rollers into and out of engagement with one of said abutments.

2. Detent mechanism having, in combination, two relatively-movable members provided with oppositely-disposed abutments, a detent adapted to be interposed between said abutments to arrest relative movement thereof and comprising two antifriction rollers free to roll upon each other and against said abutments respectively, means for holding the rollers in superposed position comprising a movable member provided with elongated pivotal bearings for the rollers, and means for moving said member to throw the rollers into and out of operative position.

3. Detent mechanism having, in combination, a stationary member provided with a ledge, a rotary member provided with an abutment surface oppositely disposed with respect to said ledge, a detent movable upon said ledge and adapted to be moved into and out of engagement with said abutment surface, and means for so moving the detent upon the ledge, said detent comprising two antifriction devices engaging said ledge and said surface, respectively, and rotatable simultaneously in opposite directions so as to move freely against both said members when under pressure.

WINTHROP K. HOWE.

Witnesses:
MARY A. O'NEILL,
FARNUM F. DORSEY.